(12) United States Patent
Jensen

(10) Patent No.: US 10,900,843 B2
(45) Date of Patent: Jan. 26, 2021

(54) IN-SITU TEMPERATURE SENSING SUBSTRATE, SYSTEM, AND METHOD

(71) Applicant: KLA-Tencor Corporation, Milpitas, CA (US)

(72) Inventor: Earl Jensen, Santa Clara, CA (US)

(73) Assignee: KLA Corporation, Milpitas, CA (US)

(*) Notice: Subject to any disclaimer, the term of this patent is extended or adjusted under 35 U.S.C. 154(b) by 238 days.

(21) Appl. No.: 16/037,445

(22) Filed: Jul. 17, 2018

(65) Prior Publication Data

US 2019/0368944 A1 Dec. 5, 2019

Related U.S. Application Data

(60) Provisional application No. 62/680,905, filed on Jun. 5, 2018.

(51) Int. Cl.
*G01K 13/00* (2006.01)
*G01K 3/14* (2006.01)
*G01K 7/00* (2006.01)

(52) U.S. Cl.
CPC .............. *G01K 3/14* (2013.01); *G01K 7/00* (2013.01)

(58) Field of Classification Search
CPC .... G01K 7/028; G01K 2211/00; G01K 13/00; G01K 2213/00; G01K 3/00; G01K 1/02
USPC ........ 374/100, 112, 160, 137, 187, 205–206, 374/54, 178
See application file for complete search history.

(56) References Cited

U.S. PATENT DOCUMENTS

| | | | | |
|---|---|---|---|---|
| 1,363,803 A * | 12/1920 | Milker | ...................... | G01K 1/04 374/194 |
| 3,604,266 A * | 9/1971 | Chilton | .................... | G01K 1/02 374/169 |
| 5,684,298 A * | 11/1997 | O'Connor | ................ | G01D 5/26 250/227.21 |
| 6,616,332 B1 | 9/2003 | Renken et al. | | |
| 9,121,470 B2 * | 9/2015 | Flener | .................... | B60J 5/0412 |
| 2002/0104990 A1 * | 8/2002 | DeReus | ............. | G02B 26/0841 257/20 |

(Continued)

FOREIGN PATENT DOCUMENTS

JP 2006078478 A 3/2006

OTHER PUBLICATIONS

International Search Report dated Sep. 20, 2019 for PCT/US2019/035273.

*Primary Examiner* — Gail Kaplan Verbitsky
(74) *Attorney, Agent, or Firm* — Suiter Swantz pc llo

(57) ABSTRACT

A sensor for detecting a temperature distribution imparted on a substrate in an environment is disclosed. The sensor includes a sensor substrate with one or more temperature sensing elements formed on the sensor substrate. In embodiments, a temperature sensing element includes at least one cavity with a thermally expandable material disposed within the cavity and a channel extending from the cavity with a slug disposed within the channel. In embodiments, the cavity has a fixed volume and is enclosed by a cover layer disposed or formed over the cavity. The thermally expandable material is configured to extend from the cavity into the channel to actuate the slug from a first position within the channel to at least a second position within the channel, where the position of the slug is indicative of a temperature of a respective portion of the sensor substrate.

27 Claims, 13 Drawing Sheets

(56) References Cited

U.S. PATENT DOCUMENTS

| | | |
|---|---|---|
| 2008/0144695 A1 | 6/2008 | Hamada |
| 2009/0074348 A1* | 3/2009 | Xia ........................ G01K 13/00 385/12 |
| 2009/0120362 A1 | 5/2009 | Hamada |
| 2010/0249766 A1* | 9/2010 | Saadat ................... A61B 18/02 606/21 |
| 2011/0233546 A1 | 9/2011 | Higashi et al. |
| 2012/0027045 A1 | 2/2012 | McLellan et al. |
| 2020/0041064 A1* | 2/2020 | Abe ....................... F16L 59/065 |

* cited by examiner

IN-SITU TEMPERATURE SENSING SUBSTRATE, SYSTEM, AND METHOD

CROSS-REFERENCE TO RELATED APPLICATIONS

The present application claims the benefit under 35 U.S.C. § 119(e) of U.S. Provisional Application Ser. No. 62/680,905, filed Jun. 5, 2018 and titled "IN-SITU WAFER MAXIMUM INDICATION APPARATUS," with inventor Earl Jensen, which is incorporated herein by reference in its entirety.

TECHNICAL FIELD

The present disclosure relates generally to sensors and more particularly to an in-situ sensing substrate, system, and method for measuring temperatures in an environment.

BACKGROUND

Heating of wafers and other semiconductor substrates can affect device performance. In order to account for and/or prevent excessive heating, it is important to be able to determine a distribution of peak temperatures imparted on a substrate in an environment. For example, it can be useful to detect peak temperatures at one or more sites on a wafer (or other substrate) in an environment, such as an epitaxy (EPI) chamber, where temperatures can be as high as 900° C.

SUMMARY

A sensor for detecting a temperature distribution imparted on a substrate in an environment is disclosed in accordance with one or more illustrative embodiments of the present disclosure. In one illustrative embodiment, the sensor includes a sensor substrate with one or more temperature sensing elements formed on the sensor substrate. In embodiments, a temperature sensing element includes at least one cavity with a thermally expandable material disposed within the cavity and a channel extending from the cavity with a slug disposed within the channel. In embodiments, the cavity has a fixed volume and is enclosed by a cover layer disposed or formed over the cavity. The thermally expandable material is configured to extend from the cavity into the channel (e.g., due to thermal excitation) to actuate the slug from a first position within the channel to at least a second position within the channel, where the position of the slug is indicative of a temperature of a respective portion of the sensor substrate. This slug is left behind as the thermally expandable material retreats, thus indicating the maximum temperature experienced by the respective portion of the sensor substrate.

In another illustrative embodiment, the sensor includes a sensor substrate with at least one temperature sensing element including a thermally expandable coil with a first end fixedly coupled to the sensor substrate. In embodiments, the temperature sensing element further includes a slug coupled to a second end of the thermally expandable coil. When the thermally expandable coil expands (e.g., due to thermal excitation), the thermally expandable coil is configured to actuate the slug from a first position to at least a second position, where the position of the slug is indicative of a temperature of a respective portion of the sensor substrate. This slug is left behind as the thermally expandable material retreats, thus indicating the maximum temperature experienced by the respective portion of the sensor substrate.

A system for detecting a temperature distribution imparted on a substrate in an environment is also disclosed in accordance with one or more illustrative embodiments of the present disclosure. In one illustrative embodiment, the system includes a sensor substrate with one or more temperature sensing elements formed on the sensor substrate and a sensor reader. In embodiments, a temperature sensing element includes at least one cavity with a thermally expandable material disposed within the cavity and a channel extending from the cavity with a slug disposed within the channel. In embodiments, the cavity has a fixed volume and is enclosed by a cover layer disposed or formed over the cavity. The thermally expandable material is configured to extend from the cavity into the channel (e.g., due to thermal excitation) to actuate the slug from a first position within the channel to at least a second position within the channel, where the position of the slug is indicative of a temperature of a respective portion of the sensor substrate. This slug is left behind as the thermally expandable material retreats, thus indicating the maximum temperature experienced by the respective portion of the sensor substrate. In embodiments, the sensor reader is configured to detect the position of the slug to determine the temperature of the respective portion of the sensor substrate.

In another illustrative embodiment, the system includes a sensor substrate with at least one temperature sensing element including a thermally expandable coil with a first end fixedly coupled to the sensor substrate and a sensor reader. In embodiments, the temperature sensing element further includes a slug coupled to a second end of the thermally expandable coil. When the thermally expandable coil expands (e.g., due to thermal excitation), the thermally expandable coil is configured to actuate the slug from a first position to at least a second position, where the position of the slug is indicative of a temperature of a respective portion of the sensor substrate. This slug is left behind as the thermally expandable material retreats, thus indicating the maximum temperature experienced by the respective portion of the sensor substrate. In embodiments, the sensor reader is configured to detect the position of the slug to determine the temperature of the respective portion of the sensor substrate.

A method that employs a sensor for detecting temperature at one or more sites on a substrate is also disclosed in accordance with one or more illustrative embodiments of the present disclosure. In one illustrative implementation of the method, a sensor substrate with one or more temperature sensing elements formed on the sensor substrate is disposed within an environment. In embodiments, a temperature sensing element includes at least one cavity with a thermally expandable material disposed within the cavity and a channel extending from the cavity with a slug disposed within the channel. In embodiments, the cavity has a fixed volume and is enclosed by a cover layer disposed or formed over the cavity. The thermally expandable material is configured to extend from the cavity into the channel (e.g., due to thermal excitation) to actuate the slug from a first position within the channel to at least a second position within the channel, where the position of the slug is indicative of a temperature of a respective portion of the sensor substrate. This slug is left behind as the thermally expandable material retreats, thus indicating the maximum temperature experienced by the respective portion of the sensor substrate. In implementations of the method, the position of the slug is detected to determine the temperature of the respective portion of the sensor substrate.

In another illustrative implementation of the method, a sensor substrate with at least one temperature sensing element including a thermally expandable coil is disposed within the environment. In embodiments, the thermally expandable coil has a first end fixedly coupled to the sensor substrate and a second end coupled to a slug. When the thermally expandable coil expands (e.g., due to thermal excitation), the thermally expandable coil is configured to actuate the slug from a first position to at least a second position, where the position of the slug is indicative of a temperature of a respective portion of the sensor substrate. This slug is left behind as the thermally expandable material retreats, thus indicating the maximum temperature experienced by the respective portion of the sensor substrate. In implementations of the method, the position of the slug is detected to determine the temperature of the respective portion of the sensor substrate.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

In order to account for and/or prevent excessive heating, it is important to be able to determine a distribution of peak temperatures imparted on a substrate (e.g., semiconductor wafer) in an environment. For example, it can be useful to detect peak temperatures at one or more sites on a substrate when it is placed in a high temperature environment, such as an epitaxy (EPI) chamber, where temperatures can be as high as 900° C.

Pyrometers are often used to monitor temperatures in EPI chambers. However, pyrometers work poorly at temperatures below 600° C., and it can be difficult to compensate for the lamp energy that is used to heat the wafer with as well as changing emissivity coefficients. Moreover, the industry typically only applies one point of measurement. One method is to use witness wafers and grow EPI films as a part of a design of experiment (DOE). The need for constant verification due to insufficient metrology with enough sensitivity, range and density, leads to as high as 30% of the chamber's capacity consumed by metrology activities.

Since there is only limited temperature closed loop control, overshoots in temperature rarely occur. Instead, the temperature follows an exponential settling to an equilibrium temperature. For example, FIG. 1B illustrates an example of a graphical plot for the temperature profile in an EPI chamber. This is well suited for a maximum temperature indicator, especially if there are many measurements sites.

One method of peak temperature indication is implemented by an indicator that irreversibly changes color when its temperature exceeds the melting of said indicator. However, this technique is limited by the maximum available temperature (<300° C.), and it is irreversible. Once the peak temperature is exceeded, the sensor wafer cannot be used again (i.e., one-time use only when peak temperature is exceeded).

In light of the limitations of existing temperature measurement techniques, there is a need for new methods of detecting a temperature distribution imparted on a substrate in a high-temperature environment, such as an EPI chamber. Accordingly, sensors, systems and methods for detecting a temperature distribution imparted on a substrate in an environment are disclosed herein.

Figure 1A:
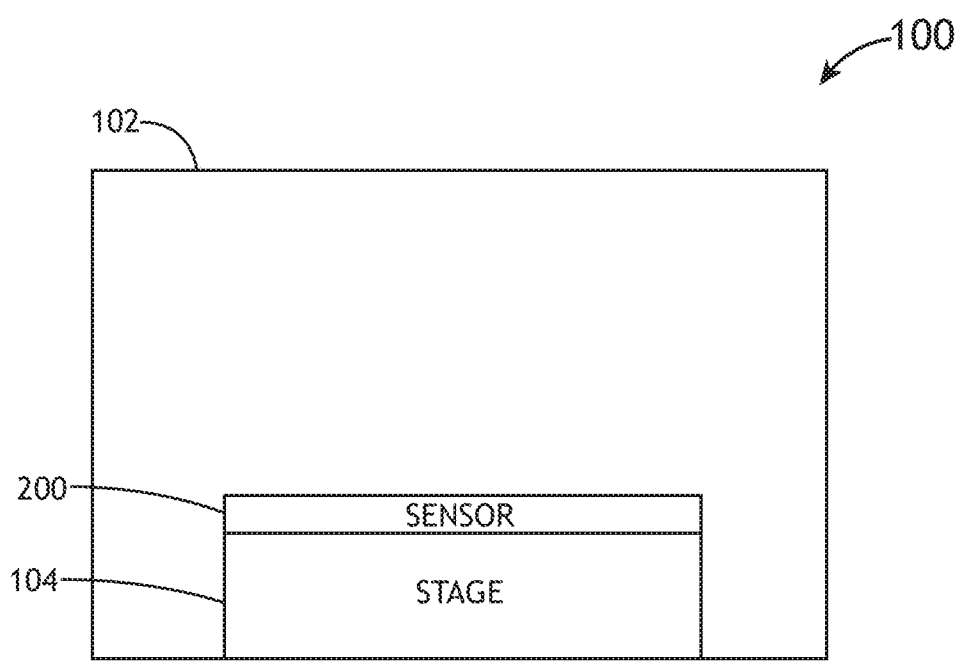
FIG. 1A is a schematic illustration of an example environment in which a sensor for detecting a temperature distribution imparted on a substrate in an environment can be implemented, in accordance with one or more embodiments of the present disclosure.
Figure 1B:
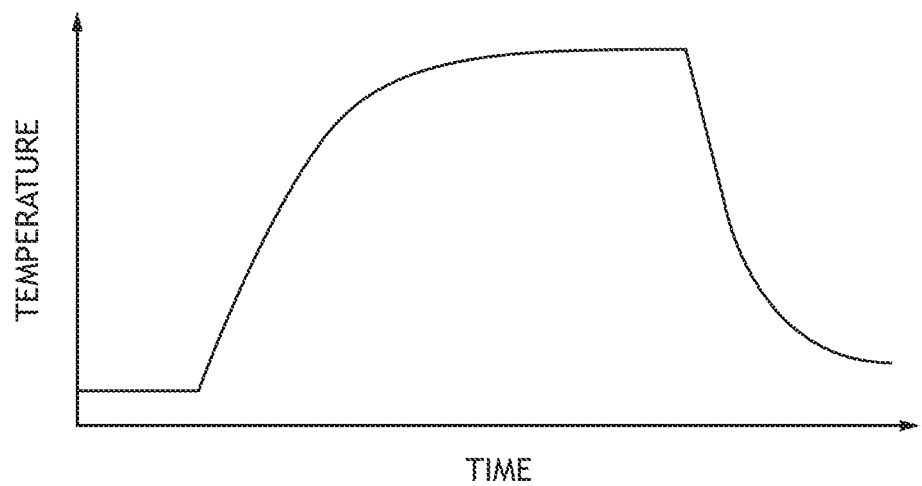
FIG. 1B is a graphical plot of a temperature profile for an epitaxy chamber, in accordance with one or more embodiments of the present disclosure.

FIG. 1A illustrates an example environment 100 in which a sensor 200 for detecting a temperature distribution imparted on a substrate in an environment can be implemented, in accordance with one or more embodiments of the present disclosure. In embodiments, the sensor 200 is configured to be supported by a stage 104 or other holder in a chamber 102 (e.g., an EPI chamber) or other closed and/or controlled environment. In some embodiments, the chamber 102 is for performing process steps (e.g., lithography, etching, etc.) and/or measurements (e.g., metrology, inspection, etc.) on a semiconductor substrate (e.g., a wafer, board, panel, reticle, or the like). The sensor 200 may have a same or a similar form factor and structure to a semiconductor substrate so that the sensor 200 can be disposed at the same or at a similar position (e.g., on the stage 104 in the chamber 102) as the semiconductor substrate would be disposed at for processing and/or metrology in the environment 100. In this manner, the sensor 200 can be subjected to the same or a similar heating pattern as a semiconductor substrate would be subjected to in the same environment 100.

In FIG. 1B, a graphical plot shows that the environment 100/chamber 102 may have a temperature profile that follows an exponential settling to an equilibrium temperature. Thus, to characterize heating characteristics of the environment 100/chamber 102, it may suffice to detect peak temperature for one or more portions of the sensor 200. In some embodiments, the sensor 200 is configured for determining peak temperature for a plurality of portions of the sensor 200 (e.g., to determine a temperature distribution that would be imparted on a similarly situated substrate).

A portion of the sensor 200 that includes a temperature sensing element is shown in FIGS. 2A through 2D in accordance with one or more embodiments of the present disclosure. One or more temperature sensing elements of the sensor 200 are formed on or at least partially within a sensor substrate 202 (e.g., a silicon wafer, or the like). For example, the one or more temperature sensing elements may include one or more micromechanical system (MMS) sensors (e.g., sensor(s) machined according to microelectromechanical system (MEMS) techniques, or the like) disposed at selected locations of the sensor substrate 202 by a MMS/MEMS fabrication process. In some embodiments (e.g., as shown in FIG. 3D), the sensor 200 includes a plurality of temperature sensing elements distributed across the sensor substrate 202 to detect temperatures that the respective portions of the sensor substrate 202 are subjected to in the environment 100/chamber 102. The sensor 200 may include any number of temperature sensing elements.

Figure 2A:
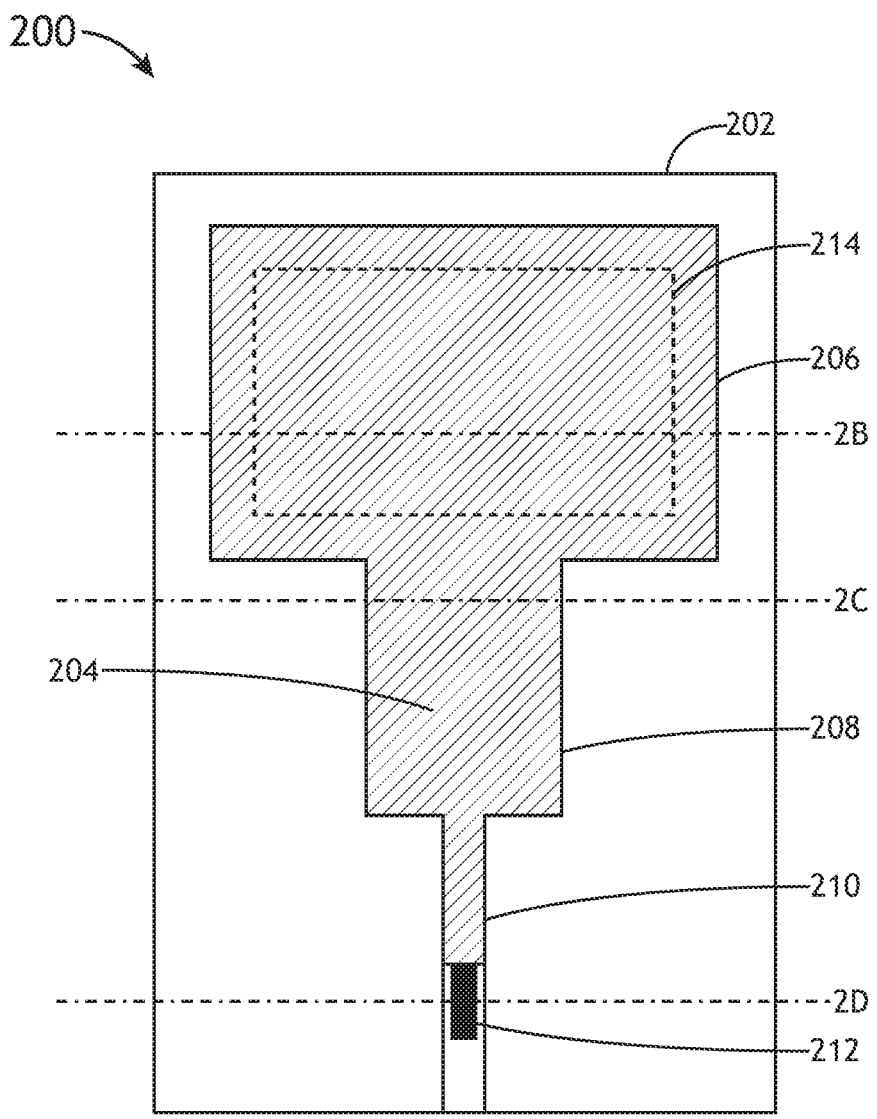
FIG. 2A is a top plan view of a temperature sensing element of a sensor for detecting a temperature distribution imparted on a substrate in an environment, in accordance with one or more embodiments of the present disclosure.

As shown in FIG. 2A, in embodiments, a temperature sensing element includes a thermally expandable material 204 disposed within at least one cavity (e.g., cavity 206 and/or 208) that is enclosed and has a fixed volume. In some embodiments, the temperature sensing element includes a base cavity 206 and an intermediate cavity 208. For example, the base cavity 206 and if equipped, intermediate cavity 208, may include solid phase thermally expandable material 204, and when the solid phase thermally expandable material 204 melts (e.g., due to thermal excitation), the material 204 may enter and/or fill the intermediate cavity 208 as liquid phase thermally expandable material 204. In some embodiments, the thermally expandable material 204 includes tin or a tin alloy. However, other materials (e.g., metals/non-metals with similar melting points (e.g., in the range of 100° C. to 400° C.)) may be used. Tin has a melting point of 232° C. and a boiling point of 2603° C. with a very low vapor pressure (>1200° C. at 10 mT). Tin's volumetric thermal coefficient of expansion (VTCE) is 0.165%·° K$^{-1}$. For example, for a sphere of approximately 1 mm$^3$, a 10° C. increase would increase the volume by 1.65% to a volume of 1.0165 mm$^3$. These values are provided as examples and/or for explanatory purposes, and such values are not intended as limitations unless otherwise stated. Some examples of other thermally expandable materials include, but are not limited to, bismuth, gallium, and mercury.

The temperature sensing element further includes a channel 210 extending from cavity 206 and/or cavity 208 with a slug 212 disposed within the channel 210. The thermally expandable material 204 is configured to extend from the cavity or cavities (e.g., cavity 206 and/or cavity 208) into the channel 210 to actuate the slug 212. That is, in order to read the increase in volume of the thermally expandable material 204, the material 204 is forced into a capillary that translates the small change in volume into a larger linear change. The operational temperature range and sensitivity may be tailored by changing the length and cross section of the capillary, the reservoir volume and selecting a suitable expansion material. The thermally expandable material 204 may actuate the slug 212 from a first (e.g., starting) position within the channel 210 to at least a second (e.g., final) position within the channel 210. The slug 212 may not react, nor may it be wetted by the expandable material 204. The position of the slug 212 is indicative of a temperature of a respective portion of the sensor substrate 202. For example, the final position of the slug 212 and/or the distance between the final position and the starting position may indicate a peak temperature that the respective portion of the sensor substrate 202 was subjected to within the environment 100/chamber 102.

Figure 2B:
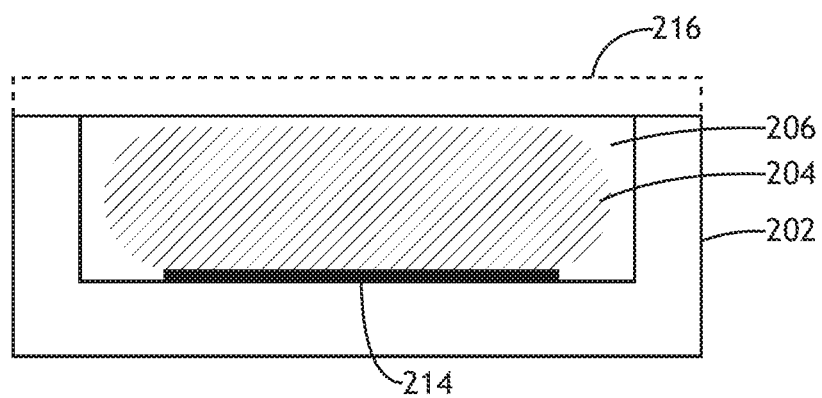
FIG. 2B is a cross-sectional view of a portion of a temperature sensing element of a sensor for detecting a temperature distribution imparted on a substrate in an environment, in accordance with one or more embodiments of the present disclosure.
Figure 2C:
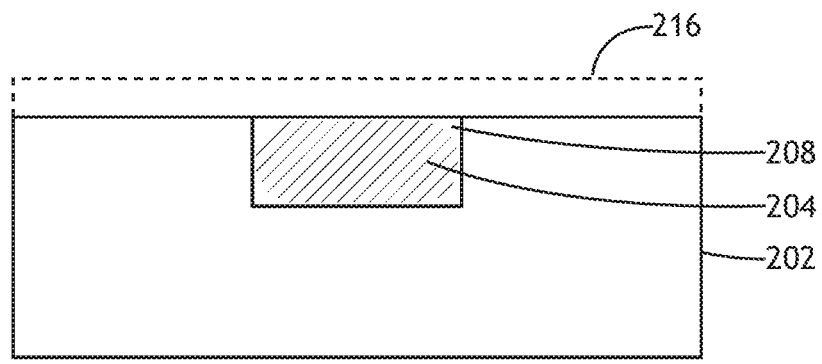
FIG. 2C is a cross-sectional view of a portion of a temperature sensing element of a sensor for detecting a temperature distribution imparted on a substrate in an environment, in accordance with one or more embodiments of the present disclosure.
Figure 2D:
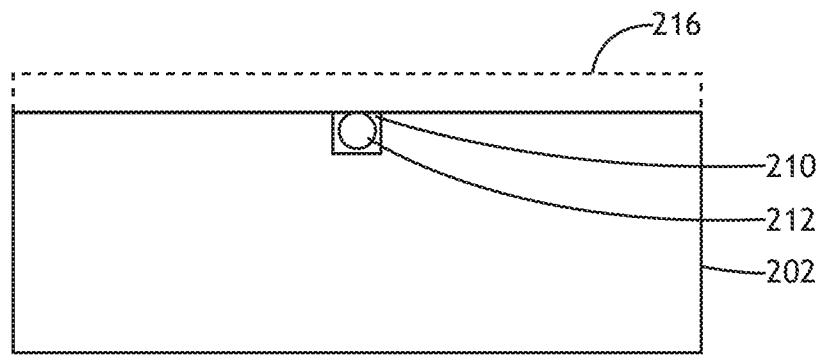
FIG. 2D is a cross-sectional view of a portion of a temperature sensing element of a sensor for detecting a temperature distribution imparted on a substrate in an environment, in accordance with one or more embodiments of the present disclosure.

FIGS. 2B through 2D show various cross-sectional views of the temperature sensing element illustrated in FIG. 2A. For example, FIG. 2B is a cross-sectional view of a portion of the temperature sensing element that includes the base cavity 206 with the thermally expandable material 204 (e.g., solid phase material) disposed therein. In some embodiment, the base cavity 206 includes an underlay 214 between an inner surface of the base cavity 206 and the thermally expandable material 204. For example, the base cavity 206 may include an underlay 214 comprising nickel, a nickel alloy, or the like for the purpose of encouraging the material 204 to gather in the cavity 206 upon a cooling trend that causes contracting of material 204.

FIG. 2C is a cross-sectional view of a portion of a temperature sensing element that includes the intermediate cavity 208 with the thermally expandable material 204 (e.g., liquid phase material) disposed therein. For example, the liquid phase thermally expandable material 204 may flow through the intermediate cavity 208 when the thermally expandable material 204 melts and/or expands due to heat within the environment 100/chamber 102.

FIG. 2D is a cross-sectional view of a portion of a temperature sensing element that includes the channel 210 with the slug 212 disposed therein. As the thermally expandable material 204 (e.g., liquid phase material) expands due to increased heat within the environment 100/chamber 102, the thermally expandable material 204 may flow through the channel 210 and push the slug 212. The final, resting position of the slug 212 is based on the total expansion of the thermally expandable material 204, and therefore, the final position of the slug 212 indicates the peak temperature that the respective portion of the substrate 202 was subjected to.

The sensor substrate 202 has a cover layer 216 disposed upon the sensor substrate 202. For example, as shown in FIGS. 2B through 2D, the base cavity 206, intermediate cavity 208, and/or channel 210 of the temperature sensing element can be enclosed or encapsulated by the cover layer 216. The cover layer 216 may be part of the sensor substrate 202 or a layer (e.g., a silicon layer or other encapsulant layer) disposed upon the sensor substrate 202.

In some embodiments, the sensor substrate 202 may have standard semiconductor wafer dimensions. For example, the sensor substrate 202 may have a diameter in the range of approximately 25 millimeters to 300 millimeters. In other embodiments, the sensor substrate 202 may have other dimensions or another shape (e.g., rectangle, oval, polygon, etc.). However, it can be advantageous for the sensor substrate 202 to have the dimensions of a standard semiconductor wafer so that the substrate 202 may be inserted within the environment 100/chamber 102 in the same manner as a standard semiconductor wafer and can have a similar temperature distribution imparted upon the sensor substrate 202 within the environment 100/chamber 102. In this regard, the sensor 200 can be configured as a "test wafer."

FIGS. 3A through 3D illustrate embodiments of a system 300 that includes an electromagnetic reader 302 configured to detect the position of the slug 212. For example, the electromagnetic reader 302 (e.g., an E-core wound with a plurality of coils 303) and the slug 212 may act as a differential transformer where the slug 212 is the moveable core. In some embodiments, the slug 212 is formed from a ferro-metallic oxide. In such configurations, the electromagnetic reader 302 and the slug 212 behave similar to a linear variable linear transformer (LVDT) where the core (e.g., slug 212) position can be said to be at a magnetic null when the core couples to the end poles equally. The resulting field is detected by the coils on the end poles (e.g., coils 303 wound around the E-core) that are 180° out of phase. A phase detector (synchronous rectification) may be used as it is sensitive and rejects noise quite well. As shown in the sensor 200 layout illustrated in FIG. 3D, a fixed dummy core 211 may be used as a reference. The expansion length of the thermally expandable material 204 and hence temperature is determined by the difference between the reference and the measurement slug 212. This configuration can be calibrated with an offset and a gain. In embodiments, the slug 212 position can be reset by a static magnetic field from either a permanent magnet or by biasing one half of the E-core with a DC current. The slug 212 may then be dragged back to its starting point (e.g., the end of the channel 210 that meets the cavity 208 (or cavity 206 if there is no intermediate cavity 208).

Figure 3A:
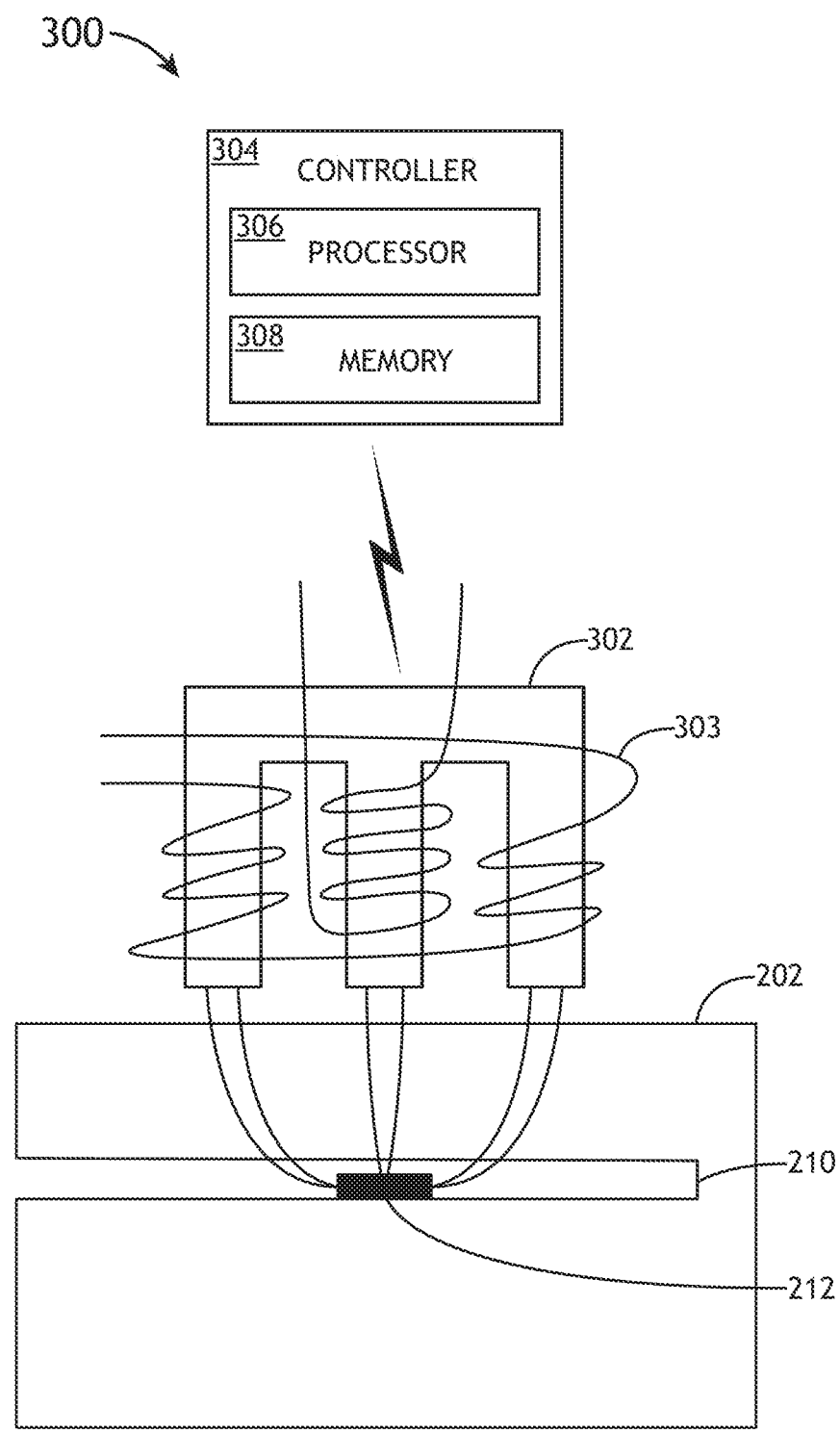
FIG. 3A is a schematic illustration of a portion of a temperature sensing element of a sensor for detecting a temperature distribution imparted on a substrate in an environment with an electromagnetic reader for reading a temperature measurement indicated by the temperature sensing element, in accordance with one or more embodiments of the present disclosure.
Figure 3B:
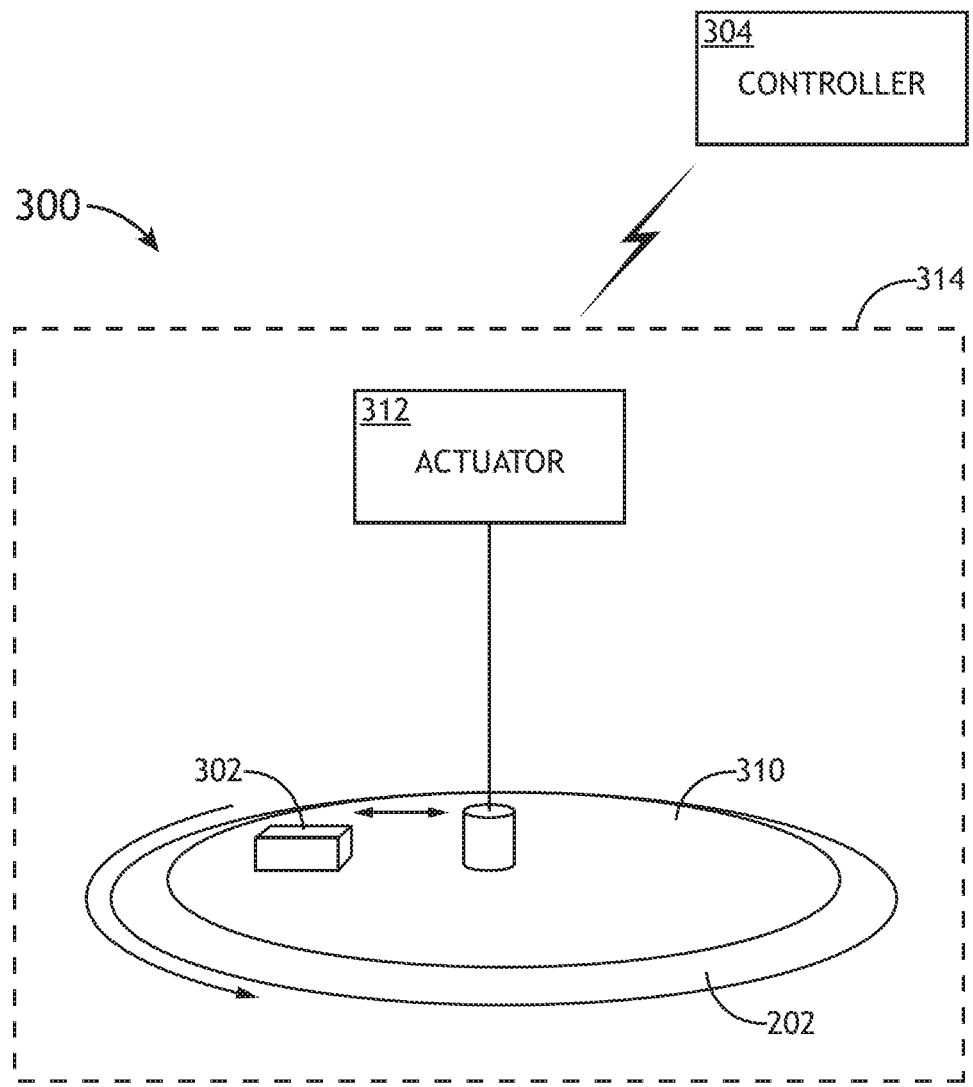
FIG. 3B is a schematic illustration of a sensor for detecting a temperature distribution imparted on a substrate in an environment with an electromagnetic reader for reading a temperature measurement indicated by the temperature sensing element, wherein the electromagnetic reader is coupled to a rotatable disk, in accordance with one or more embodiments of the present disclosure.
Figure 3C:
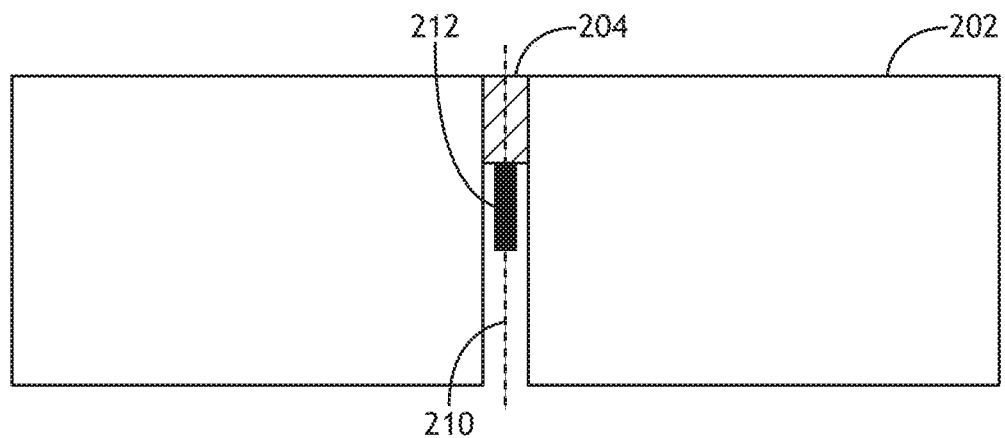
FIG. 3C is a schematic illustration of a portion of a temperature sensing element of a sensor for detecting a temperature distribution imparted on a substrate in an environment, in accordance with one or more embodiments of the present disclosure.
Figure 3D:
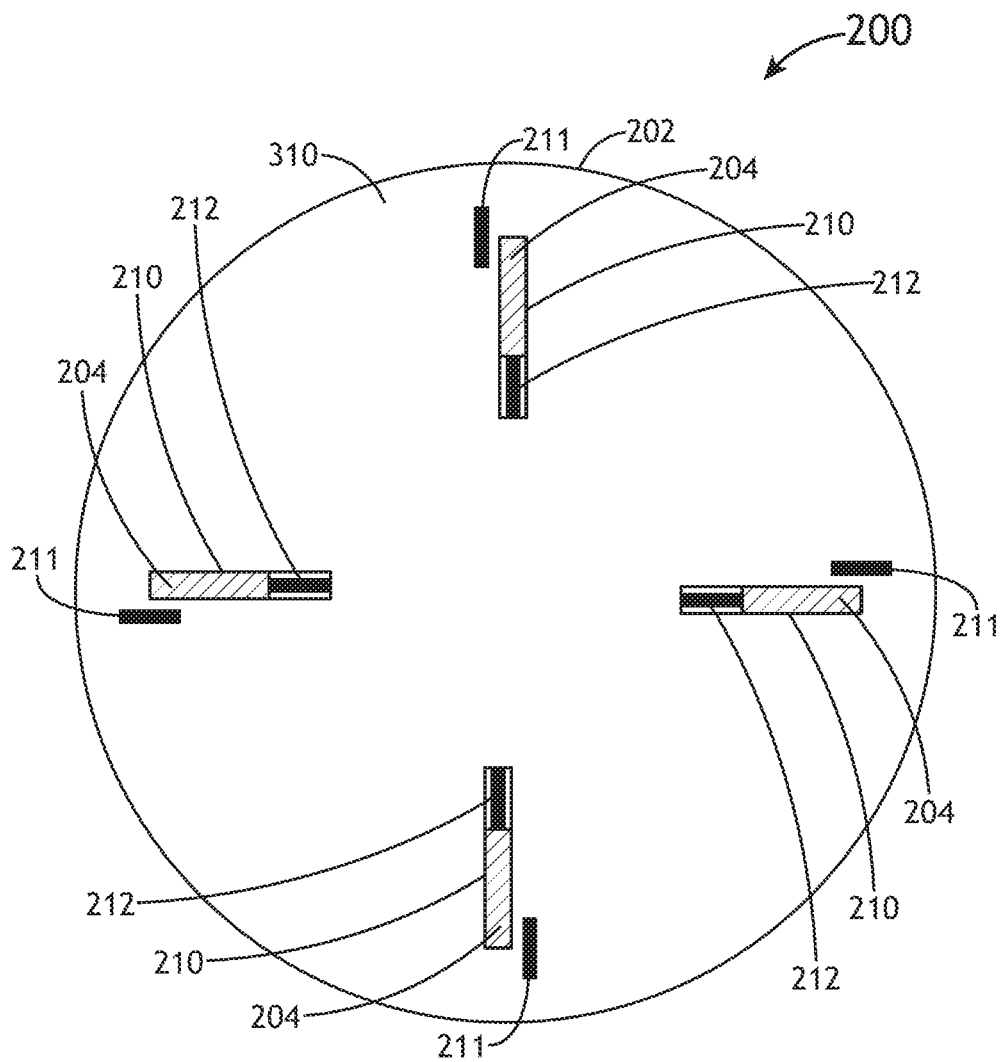
FIG. 3D is a schematic illustration of a sensor for detecting a temperature distribution imparted on a substrate in an environment, wherein the sensor includes a plurality of temperature sensing elements, in accordance with one or more embodiments of the present disclosure.

As shown in FIG. 3B, in some embodiments, the electromagnetic reader 302 may be movable with respect to the sensor substrate 202. For example, the electromagnetic reader 302 may be coupled to a scanning disc 310 (e.g., a rotatable substrate) that can be rotated by an actuator 312 (e.g., a motor) to scan the slug 212 positions of multiple temperature sensing elements on the substrate 202. The electromagnetic reader 302 may also be configured to actuate linearly (e.g., radially) along the disc 310.

In some embodiments, the electromagnetic reader 302 is in an enclosure 314. For example, the sensor substrate 202 may be placed within the enclosure 314 to be read after the sensor substrate 202 takes measurements within the environment 100/chamber 102. The enclosure 314 may be a front opening universal pod (FOUP) or a chamber configured to receive the sensor substrate 202. In some embodiments, the enclosure 314 is a FOUP configured to be handled by a factory automation (FA) system. In other embodiments, the enclosure 314 is the chamber 102. For example, the electromagnetic reader 302 may be disposed within the chamber 102.

In embodiments, the system 300 includes a controller 304 communicatively coupled to the electromagnetic reader 302. In some embodiments, the controller 304 includes one or more processors 306 configured to execute program instructions maintained on a memory medium 308. In this regard, the one or more processors 306 of controller 304 may execute any of the various process steps or operations described throughout the present disclosure, such as receiving electrical signals corresponding to a position or change in position of the slug 212 from the electromagnetic reader 302, controlling one or more actuators (e.g., actuator 312), and so forth.

The one or more processors 306 of a controller 304 may include any processing element known in the art. In this sense, the one or more processors 306 may include any microprocessor-type device configured to execute algorithms and/or instructions. In one embodiment, the one or more processors 306 may comprise a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 308.

The memory medium 308 may include any storage medium known in the art suitable for storing program instructions executable by the associated one or more processors 306. For example, the memory medium 308 may include a non-transitory memory medium. By way of another example, the memory medium 308 may include, but is not limited to, a read-only memory, a random access memory, a magnetic or optical memory device (e.g., disk), a magnetic tape, a solid state drive and the like. It is further noted that memory medium 308 may be housed in a common controller housing with the one or more processors 306. In one embodiment, the memory medium 308 may be located remotely with respect to the physical location of the one or more processors 306 and controller 304. For instance, the one or more processors 306 of controller 304 may access a remote memory (e.g., server), accessible through a network (e.g., internet, intranet and the like). Therefore, the above description should not be interpreted as a limitation on the present invention but merely an illustration.

In embodiments, the controller 304 is configured to communicate with the electromagnetic reader 302. For example, the controller 304 can be configured to receive any combination of raw data (e.g., electrical signals), processed data (e.g., magnetic field strength measurements, distance or displacement measurements, and the like), and/or partially-processed data. Further, the steps described throughout the present disclosure may be carried out by a single controller 304 or, alternatively, multiple controllers. Additionally, the controller 304 may include one or more controllers housed in a common housing or within multiple housings. In this way, any controller or combination of controllers may be separately packaged as a module suitable for integration into the system 300.

Figure 4A:
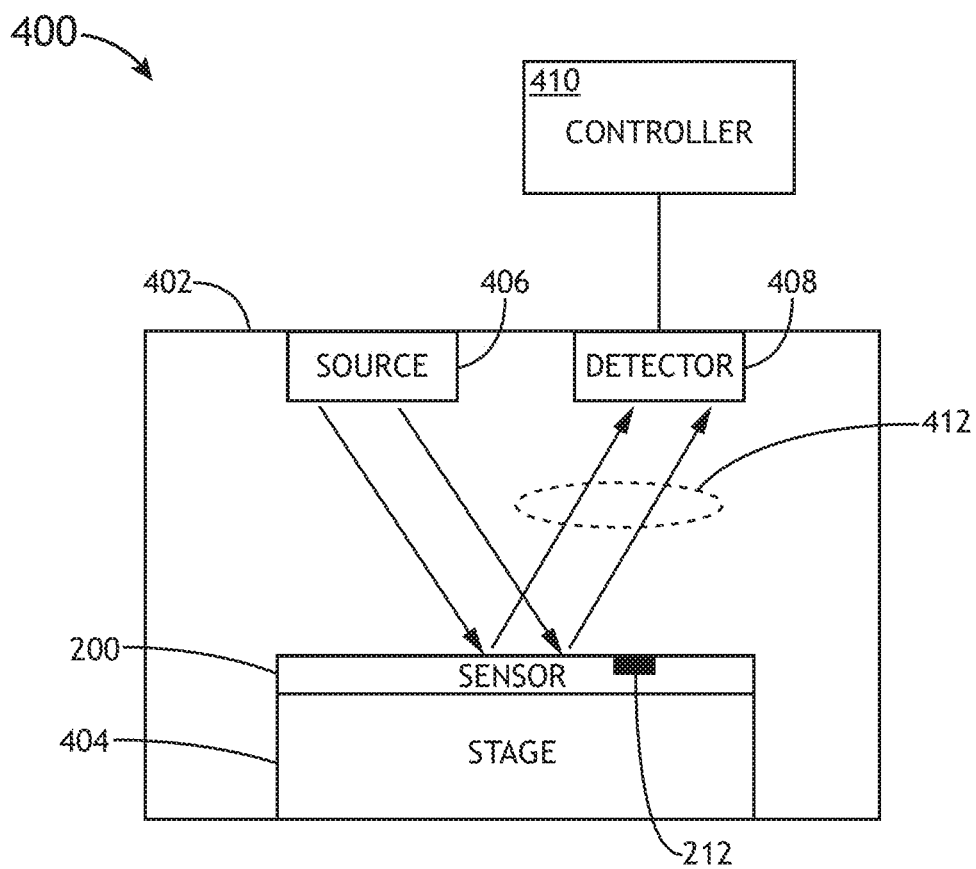
FIG. 4A is a schematic illustration of a sensor for detecting a temperature distribution imparted on a substrate in an environment with an optical detector for reading a temperature measurement indicated by the temperature sensing element, in accordance with one or more embodiments of the present disclosure.
Figure 4B:
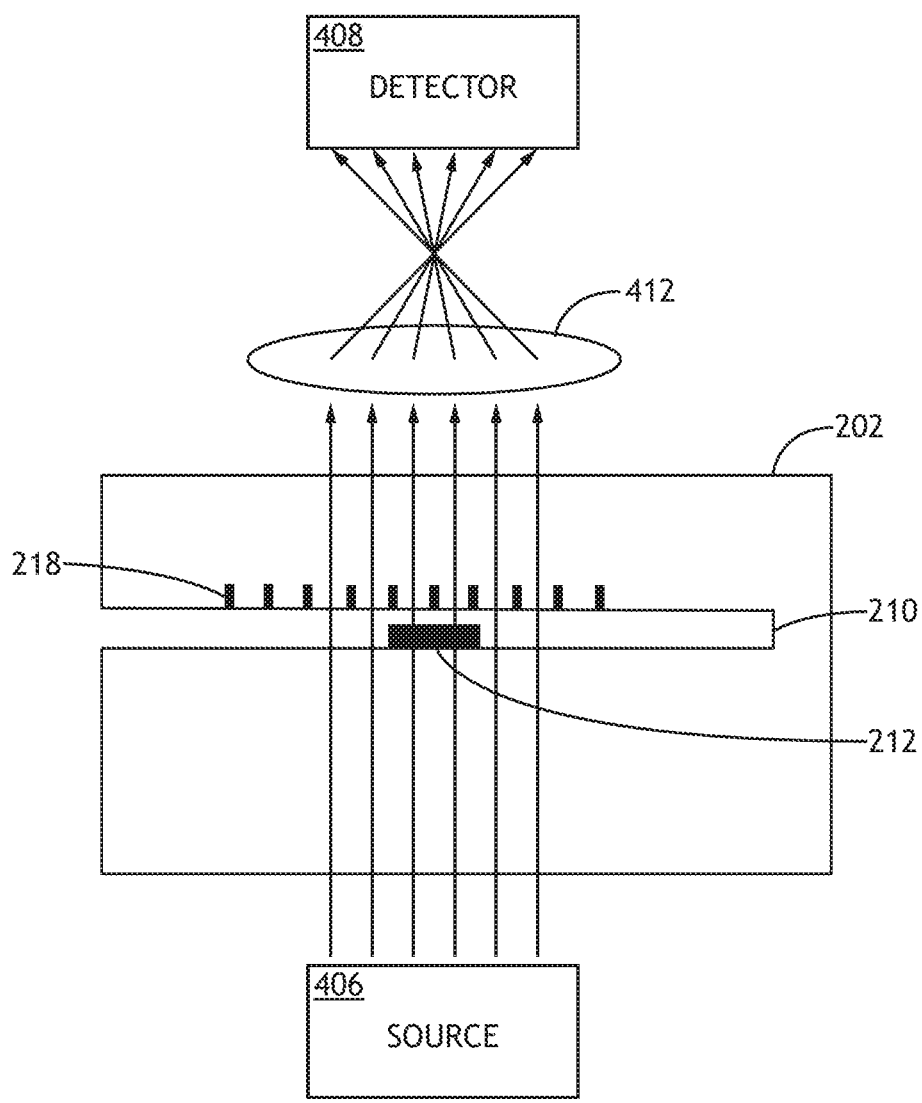
FIG. 4B is a schematic illustration of a portion of a temperature sensing element of a sensor for detecting a temperature distribution imparted on a substrate in an environment with an optical detector for reading a temperature measurement indicated by the temperature sensing element, in accordance with one or more embodiments of the present disclosure.
Figure 4C:
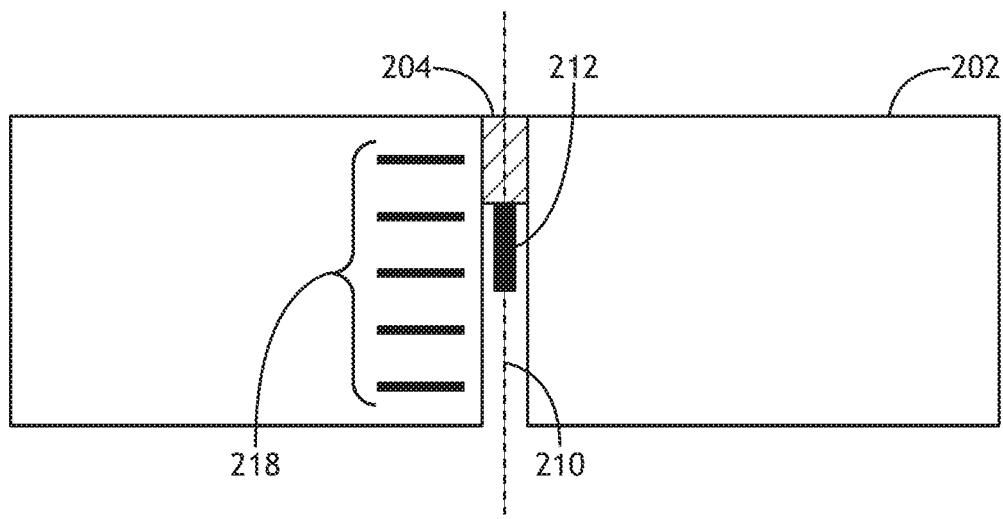
FIG. 4C is a schematic illustration of a portion of a temperature sensing element of a sensor for detecting a temperature distribution imparted on a substrate in an environment, wherein the temperature sensing element includes reference marks to assist with detection of a position of a slug of the temperature sensor element, in accordance with one or more embodiments of the present disclosure.

FIGS. 4A through 4C illustrate embodiments of a system 400 that includes an optical detector 408 (e.g., a camera, photodiode array, or the like) configured to detect the position of the slug 212. Silicon is transparent after the bandgap and it is quite clear at 1.5 um. Thus, when the substrate 202 is a silicon wafer, or the like, the position of the slug 212 can be read optically without difficulty. For example, the system 400 may include a source 406 (e.g., a broadband or narrowband light source) configured to illuminate the sensor substrate 202, where the detector 408 then collects images of the illuminated portions of the sensor substrate 202 to detect the position of the slug 212. Although FIG. 4A illustrates the source 406 and detector 408 emitting and receiving structured (e.g., focused and/or collimated) illumination, respectively; the source 406 and detector 408 can be otherwise configured. For example, in some embodiments, the source 406 may be configured to emit unstructured (e.g., diffused) illumination. As shown in FIGS. 4B and 4C, the position of the slug 212 can be determined as the distance between the slug 212 and reference marks 218 printed or patterned on the sensor substrate 202 (e.g., along the channel 210 in proximity to the slug 212). In embodiments, the system 400 includes a lens system 412 configured to direct and/or focus illumination reflected, refracted, scattered, and/or radiated from the sensor substrate 202 onto the detector 408 so that the detector 408 can collect an intelligible image of the slug 212 relative to the sensor substrate 202 (e.g., relative to the reference marks 218). After detecting the position of the slug 212, the slug 212 position may be reset by applying a magnetic field (e.g., with a permanent or electromagnet, as previously described herein).

In some embodiments, the optical detector 408 is in an enclosure 402. For example, the sensor substrate 202 may be placed within the enclosure 402 to be read after the sensor substrate 202 takes measurements within the environment 100/chamber 102. The enclosure 402 may be a front opening universal pod (FOUP) or a chamber configured to receive the sensor substrate 202. In some embodiments, the enclosure 402 is a FOUP configured to be handled by a factory automation (FA) system. In other embodiments, the enclosure 402 is the chamber 102. For example, the optical detector 408 (and source 406) may be disposed within the chamber 102.

The system 400 may further include a stage 404 (e.g., a stationary or moveable stage) configured to support the sensor substrate 202. In some embodiments, the stage 404 is configured to move the sensor substrate 202 with respect to the detector 408 so that the detector 408 can scan multiple portions (e.g., multiple temperature sensing elements) of the sensor substrate 202.

In embodiments, the system 400 includes a controller 410 (e.g., similar to controller 304 described herein with reference to system 300). The controller 410 is communicatively coupled to the optical detector 408. In some embodiments, the controller 410 includes one or more processors configured to execute program instructions maintained on a memory medium. In this regard, the one or more processors of controller 410 may execute any of the various process steps or operations described throughout the present disclosure, such as receiving electrical signals or image signals to detect a position or change in position of the slug 212 from the optical detector 408, controlling one or more actuators (e.g., stage 404 actuators), controlling the illumination source 406, and so forth.

Figure 5:
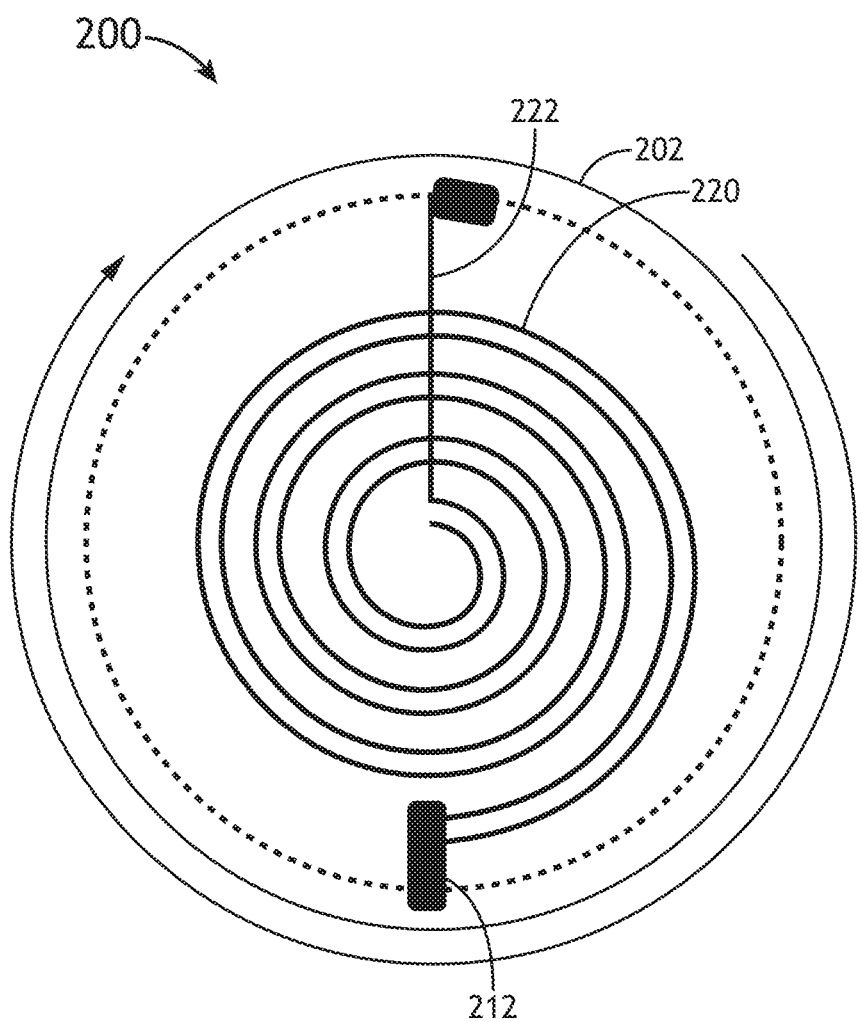
FIG. 5 is a schematic illustration of a sensor for detecting a temperature distribution imparted on a substrate in an environment, wherein a temperature sensing element of the sensor includes a thermally expandable coil configured to push a slug of the temperature sensing element, in accordance with one or more embodiments of the present disclosure.

FIG. 5 illustrates another embodiment of the sensor 200, where the temperature sensing element includes a thermally expandable coil 220 with a first end fixedly coupled to the sensor substrate 202 (e.g., to a fixed base member 222) and a second end coupled to a slug 212. When the thermally expandable coil 220 expands (e.g., due to thermal excitation), the thermally expandable coil 220 is configured to actuate the slug 212 from a first (e.g., starting) position to at least a second (e.g., final) position. As with other embodiments of the sensor 200, the position of the slug 212 is indicative of a temperature of a respective portion of the sensor substrate 202. In some embodiments, the thermally expandable coil 220 is a bimetallic spring built in MMS/MEMS technology. A rotation results as temperature increased due the in unequal expansion rates on each side of the spiral spring. Namely the inside of the spring expands at a higher rate that the outside. For example, poly-silicon and plated nickel. The 'needle' pushes the slug 212, which may be formed from ferro-magnetic material. The slug position 212 may be detected by an electromagnetic reader 302 or optical detector 408, as described above, and can be subsequently be reset back to its original position.

Figure 6:
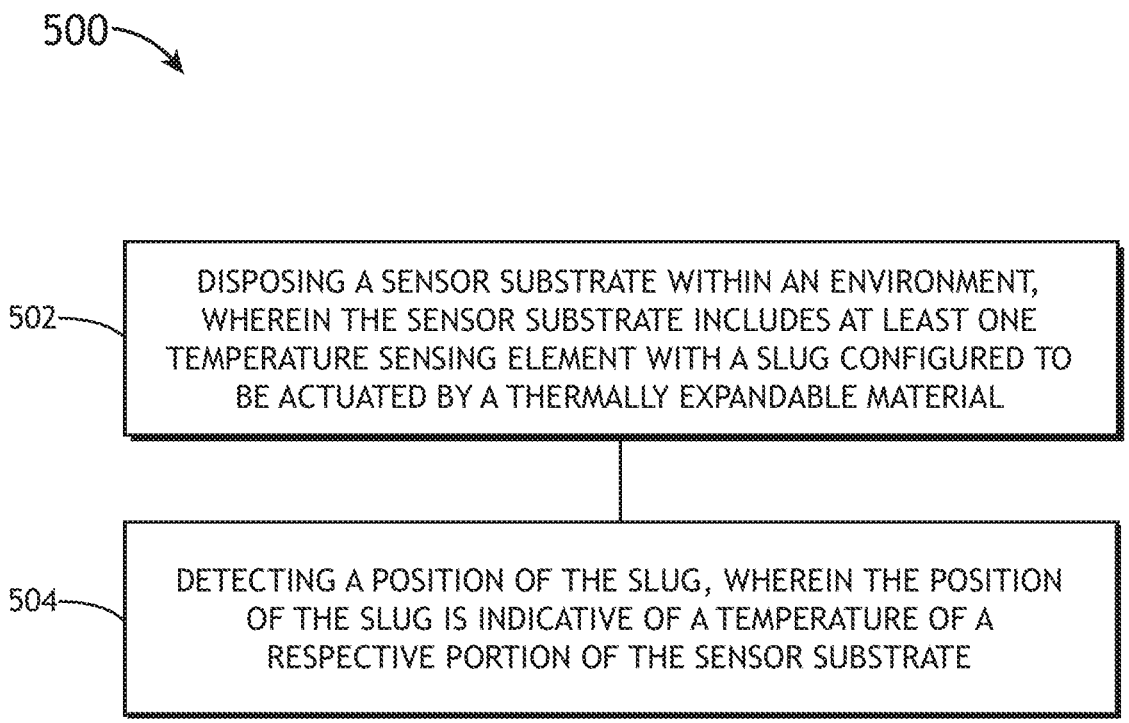
FIG. 6 is a flow diagram illustrating method for detecting a temperature distribution imparted on a substrate in an environment with a sensor, such as the sensor illustrated in any of FIGS. 1A through 5, in accordance with one or more implementations.

FIG. 6 illustrates steps performed in a method 500 that employs a sensor for detecting temperature at one or more sites on a substrate, such as the sensor 200 described above. At step 502, the sensor 200 is disposed within an environment (e.g., environment 100/chamber 102). In accordance with one or more embodiments of this disclosure, the sensor 200 includes a sensor substrate 202 with at least one temperature sensing element including a slug 212 configured to be actuated by a thermally expandable material (e.g., material 204 or coil 220). At step 504, the position of the slug 212 is detected to determine a temperature of the respective portion of the sensor substrate 202 (e.g., the peak temperature that the respective portion of the sensor substrate 202 was subjected to in the environment 100/chamber 102). For example, the position of the slug 212 may be detected by an electromagnetic reader 302 or optical detector 408, as described above.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A sensor for detecting a temperature distribution imparted on a substrate in an environment, comprising:
   a sensor substrate; and
   at least one temperature sensing element formed on the sensor substrate, the at least one temperature sensing element including:
      at least one cavity with a thermally expandable material disposed within the at least one cavity, the at least one cavity having a fixed volume and being enclosed by a cover layer; and
      a channel extending from the at least one cavity with a slug disposed within the channel, wherein the thermally expandable material is configured to extend from the at least one cavity into the channel to actuate the slug from a first position within the channel to at least a second position within the channel, wherein a position of the slug is indicative of a temperature of a respective portion of the sensor substrate.

2. The sensor of claim 1, wherein the sensor substrate comprises a silicon wafer.

3. The sensor of claim 2, wherein the silicon wafer has a diameter in the range of 25 millimeters to 300 millimeters.

4. The sensor of claim 1, wherein the at least one sensing element comprises a micromechanical system (MMS) sensor.

5. The sensor of claim 4, wherein the MMS sensor is disposed at a selected location on the sensor substrate utilizing a MMS or microelectromechanical system (MEMS) fabrication process.

6. The sensor of claim 1, wherein the at least one cavity comprises a base cavity and an intermediate cavity, the intermediate cavity being disposed between the base cavity and the channel.

7. The sensor of claim 6, wherein the base cavity includes a nickel underlay between an inner surface of the base cavity and the thermally expandable material.

8. The sensor of claim 1, wherein the slug comprises a ferro-metallic oxide slug.

9. A system for detecting a temperature distribution imparted on a substrate in an environment, comprising:
   a sensor substrate;
   at least one temperature sensing element formed on the sensor substrate, the at least one temperature sensing element including:
      at least one cavity with a thermally expandable material disposed within the cavity, the at least one cavity having a fixed volume and being enclosed by a cover layer; and
      a channel extending from the at least one cavity with a slug disposed within the channel, wherein the thermally expandable material is configured to extend from the at least one cavity into the channel to actuate the slug from a first position within the channel to at least a second position within the channel; and
   a sensor reader configured to detect a position of the slug, wherein the position of the slug is indicative of a temperature of a respective portion of the sensor substrate.

10. The system of claim 9, wherein the sensor substrate comprises a silicon wafer.

11. The system of claim 10, wherein the silicon wafer has a diameter in the range of 25 millimeters to 300 millimeters.

12. The system of claim 9, wherein the at least one sensing element comprises a micromechanical system (MMS) sensor.

13. The system of claim 12, wherein the MMS sensor is disposed at a selected location on the sensor substrate utilizing a MMS or microelectromechanical (MEMS) fabrication process.

14. The system of claim 9, wherein the at least one cavity comprises a base cavity and an intermediate cavity, the intermediate cavity being disposed between the base cavity and the channel.

15. The system of claim 14, wherein the base cavity includes an underlay between an inner surface of the base cavity and the thermally expandable material.

16. The system of claim 9, wherein the slug comprises a ferro-metallic oxide slug.

17. The system of claim 9, wherein the sensor reader comprises a front opening universal pod configured to receive the sensor substrate.

18. The system of claim 17, wherein the front opening universal pod is configured to be handled by a factory automation system.

19. The system of claim 9, wherein the sensor reader comprises an electromagnetic reader.

20. The system of claim 19, wherein the electromagnetic reader comprises a set of coils wound around an E-core.

21. The system of claim 9, wherein the sensor reader comprises an optical detector.

22. The system of claim 21, wherein the optical detector comprises a camera.

23. The system of claim 9, further comprising reference marks printed or patterned on the sensor substrate in proximity to the slug to assist with the detection of the position of the slug by the optical detector.

24. The system of claim 9, further comprising:
   an actuator configured to reposition the sensor reader relative to the sensor substrate to scan one or more temperature sensing elements.

25. The system of claim 9, further comprising:
a magnetic field generator configured to generate a magnetic field to reset the slug from the second position back to the first position.

26. A sensor for detecting a temperature distribution imparted on a substrate in an environment, comprising:
a sensor substrate; and
at least one temperature sensing element formed on the sensor substrate, the at least one temperature sensing element including:
 a thermally expandable coil with a first end and a second end, the first end being fixedly coupled to the sensor substrate; and
 a slug coupled to the second end of the thermally expandable coil, wherein the thermally expandable coil is configured to actuate the slug from a first position to at least a second position, wherein a position of the slug is indicative of a temperature of a respective portion of the sensor substrate.

27. A system for detecting a temperature distribution imparted on a substrate in an environment, comprising:
a sensor substrate;
at least one temperature sensing element formed on the sensor substrate, the at least one temperature sensing element including:
 a thermally expandable coil with a first end and a second end, the first end being fixedly coupled to the sensor substrate; and
 a slug coupled to the second end of the thermally expandable coil, wherein the thermally expandable coil is configured to actuate the slug from a first position to at least a second position; and
a sensor reader configured to detect a position of the slug, wherein the position of the slug is indicative of a temperature of a respective portion of the sensor substrate.

* * * * *